United States Patent [19]

Malz, Jr. et al.

[11] 4,018,747

[45] Apr. 19, 1977

[54] PRODUCTION OF FIBER-FORMING POLYAMIDES BY TRANSAMIDATION OF N-ALICYCLIC DIAMIDES WITH DICARBOXYLIC ACIDS

[75] Inventors: Russell E. Malz, Jr., Naugatuck; Robert W. Brown, Middlebury; Harold Greenfield, Watertown, all of Conn.

[73] Assignee: Uniroyal, Inc., New York, N.Y.

[22] Filed: Apr. 20, 1976

[21] Appl. No.: 678,571

Related U.S. Application Data

[63] Continuation-in-part of Ser. No. 542,156, Jan. 20, 1975, abandoned.

[52] U.S. Cl. .......................... 260/78 R; 260/33.4 R
[51] Int. Cl.$^2$ ......................................... C08G 69/28
[58] Field of Search .................................. 260/78 R

[56] References Cited

OTHER PUBLICATIONS

Beste et al — Journal of Polymer Science, vol. 8, No. 4, 1952, pp. 395–407.
Korshak–Frunze — Synthetic Heterochain Polyamides, 1964, pp. 13, 86.
Rafikov et al — Akademiia Nauk SSSR, Izvestiia, Otdelenie Khimicheskaya nauk, 1953, No. 4, pp. 743–750.

*Primary Examiner*—Harold D. Anderson
*Attorney, Agent, or Firm*—James J. Long

[57] ABSTRACT

Fiber-forming polyamides are made by transamidation of N-alicyclic diamides with dicarboxylic acids. E.g., bis(4-acetamidocyclohexyl)methane and 1,12-dodecanedioic acid are heated together under nitrogen, then under reduced pressure, to produce a fiber-forming polyamide.

8 Claims, No Drawings

PRODUCTION OF FIBER-FORMING POLYAMIDES BY TRANSAMIDATION OF N-ALICYCLIC DIAMIDES WITH DICARBOXYLIC ACIDS

This application is a continuation-part of our copending application Ser. No. 542,156 filed Jan. 20, 1975 now abandoned.

This invention relates to a method for the production of fiber-forming N-aclicyclic polyamides by the reaction of N-alicyclic diamides with dicarboxylic acids.

The transamidation of monoamides with carboxylic acids has been studied (R. N. Ring, J. G. Sharefkin, and D. Davidson, J. Org. Chem., 27, 2428; Michman, S. Patai, and I. Shenfeld. J. Chem. Soc. (C), 1967, 1337.). Formation of polyamides by reaction of N,N'-diacetylhexamethylenediamine with sebacic or adipic acid has been disclosed [Beste et al., J. Polymer Sci., 8 395–407 (1952); Korshak and Frunze "Synthetic Heterochain Polyamides", 1964, p. 13, 86; Rafikov et al., Izvest. Akad. Nauk S.S.S.R., Otdel, Khim. Nauk 1953, 743–50], but the formation of fiber-forming polyamides with silk-like hand by reaction of an N-alicyclic diamide with a dicarboxylic acid has not previously been disclosed. The production of polyamides by polymerizing N-acylaminocarboxylic acids is known (U.S. Pat. No. 2,227,152, Schlack, Mar. 24, 1942).

Certain valuable, silk-like polyamides are presently manufactured by the conventional polymerization of alicyclic diamines with dicarboxylic acids (U.S. Pat. Nos. 2,512,606, Bolton, et al., June 27, 1950, 3,249,591, Gadecki, et. al., May 3, 1966 and 3,393,210, July 16, 1968). A major problem in this prior art process is the difficulty and expense of obtaining an alicyclic diamine of suitable purity. Such diamines are made by the nuclear hydrogenation of the corresponding aryl diamines, and this procedure is known to have high catalyst requirements and costs, high equipment and operating costs because of the need for elevated temperatures and pressures, and to involve difficulties in obtaining a pure product because of by-product formation resulting from several side reactions (Greenfield, Annals of the New York Academy of Sciences Volume 214, pages 233–242, June 15, 1973).

In accordance with the present invention, these problems are to a large extent obviated by the production of such silk-like polyamides by the transamidation of N-alicyclic diamides [economically available in high purity by the nuclear hydrogenation of N-aryl diamides (U.S. Pat. No. 3,867,443, Malz, Jr. and Greenfield, Feb. 18, 1975)].

In general, the transamidation polymerization process of the invention involves reaction of a dicarboxylic acid:

HOOC—R—COOH, with an N-alicyclic diamide:

R$^1$—CONH—R$^2$—NHCO—R$^3$, to form a fiber-forming polymer having a chain of repeating amide units:

—CO—R—CONH—R$^2$—NH—, along with by-product monocarboxylic acids:

R$^1$COOH and R$^3$COOH.

In the dicarboxylic acid R may be aliphatic, alicyclic, alicyclic-aliphatic, or aromatic. Preferred from a viewpoint of their cost, availability and the desirable properties obtained therefrom are those acids where R is an alkylene group —(CH$_2$)—$_z$, where $z$ is an integer greater than 2, frequently 3 to 20. Included in this group are glutaric acid (1,5-pentanedioc acid), adipic acid (1,6-hexanedioic acid), pimelic acid (1,7-heptanedioic acid), suberic acid (1,8-octanedioic acid), azelic acid (1,9-nonanedioic acid), sebacic acid (1,10-decanedioic acid) and 1,12-dodecanedioic acid. Although these dicarboxylic acids are preferred because of their cost, availability, and the desirable properties of the polyamides obtained therefrom, other dicarboxylic acids, including alkyl-substituted branched-chain dicarboxylic acids, such as 2-methyladipic acid, 3-methyladipic acid, and 3,3-dimethylglutaric acid may also be used. Examples where R is alicyclic are 1,2-cyclohexanedicarboxylic acid and 1,4-cyclohexanedicarboxylic acid; where R is alicyclic-aliphatic is 1,2-cyclohexanediacetic acid; where R is aromatic are terephthalic acid, isophthalic acid, phthalic acid, 4-methylphthalic acid, 2,3-naphthalenedicarboxylic acid and tetramethylterephthalic acid; where R is arylalkyl are p-phenylenediacetic acid and m-phenylenediacetic acid. Typically the dicarboxylic acids have from 5 to 22 carbon atoms.

In the diamide employed R$^1$ and R$^3$ may be the same or different and may be hydrogen, C$_1$–C$_{18}$ alkyl (such as methyl, propyl, butyl, stearyl), phenyl or benzyl, preferably methyl, while R$^2$ is alicyclic. Suitable examples are bis(4-acetamidocyclohexyl)methane, 1,3-cyclohexylenebisacetamide, 1,4-cyclohexylenebisacetamide, 1,3-(4-methylcyclohexylene)-bisacetamide, bis(4-acetamidocyclohexyl), 1,2-di(4-acetamidocyclohexyl)ethane, bis(2-methyl-4-acetamidocyclohexyl)methane, 2,2-di(4-acetamidocyclohexyl)propane, 1,6-di(4-acetamidocyclohexyl)hexane, 1,5-bisacetamidodecalin, and 1,7-bisacetamidodecalin. The acetamido group is the preferred amido group because of the favorable economics and practicality of using such acylating agents as ketone and acetic anhydride, but other amido groups such as formamido, propionamido, butyramido, stearamido, benzamido, and the like may be used, as in bis(4-formamidocyclohexyl)methane, bis(4-propionamidocyclohexyl)methane, bis(4-butyramidocyclohexyl) methane, 1,4-cyclohexylenebispropionamide, 1,3-cyclohexylenebisbutyramide, 1,3-(4-methylcyclohexylene)bispropionamide, 1,3-(4-methylcyclohexylene)bisbutyramide, etc.

In many cases R is a C$_3$–C$_{20}$ alkylene group —(CH$_2$)$_z$—where $z$ is 3 to 20, R$^2$ is a C$_6$–C$_{12}$ cycloalkylene or C$_{13}$–C$_{20}$ alkanebiscycloalkylene group (wherein the cyclic moiety may be further substituted with 1 or 2 lower alkyl [e.g., methyl, ethyl] groups), and R$^1$ and R$^3$ may be the same or different and are hydrogen or C$_1$–C$_{18}$ alkyl.

In the polymeric product $+$CO—R—CONH—R$^2$—NH$+_n$, the degree of polymerization, $n$, will vary. For fiber production, $n$ ordinarily has a value such that the molecular weight of the polymer is 10,000 or greater. Ordinarily $n$ has a value of from 9 to 60 based on intrinsic viscosity measurement. The corresponding molecular weights of the resultant polymers frequently range from about 7000 to 25,000, but it will be understood that molecular weights of the polymers greatly depend on the molecular weight of reagents used and may therefore vary considerably even if the values for n remained constant. The end groups of the polymer made by the present method are carboxyl and carboxamide, whereas the end groups of polyamides made from diacids and diamines are carboxyl and amino.

The transamidation polymerization process of the invention is carried out by bringing essentially equimolar quantities of the N-alicyclic diamide and the dicarboxylic acid together and heating the resulting mixture in two stages. In Stage I the mixture is heated under an inert atmosphere at atmospheric pressure for 2-10 hours at 220° – 350° C (preferably 3-6 hours at 235° – 300° C). In Stage II the mixture is heated under a reduced pressure of from 1 to 50 mm of Hg for 1/3-10 hours at 300° – 350° C (preferably 3 – 15 mm of Hg for ⅓ – 4 hours at 300° – 340° C). There is thereby formed an N-alicyclic polyamide containing repeating structural units having the formula $$-CO-R-CONH-R^2-NH-$$

wherein R and $R^2$ are as defined above, said polyamide having an inherent viscosity of at least 0.4 deciliters per gram measured at 25° C and a concentration of 0.5 gram of said polyamide in 100 milliliters of m-cresol.

The inherent viscosity may be determined in conventional manner, for example in a size 300, No. 1347 Cannon-Fenske Routine calibrated viscometer at 25° using a concentration of 0.5 g of polymer in 100 ml of m-cresol. The inherent viscosity is defined as the logarithm of the relative viscosity (the quotient of the viscosity of the solution and the viscosity of the solvent) divided by the concentration of the solution in grams of polymer per 100 ml of solution. The intrinsic viscosity is the limiting value of the inherent viscosity extrapolated to zero concentration.

The polymers which have attained or exceeded the inherent viscosity of 0.4 may be spun into fibers at temperatures in the range of 200° and then drawn again to two or more times their original length. These fibers will then have tensile strengths in the range of 3 or more grams per filament denier as described in U.S. Pat. No. 3,393,210, Speck, July 16, 1968. The tensile strength may be calculated by the following equation:

$$\text{Tensile Strength} = \frac{\text{breaking strength}}{\text{filament denier}}$$

where breaking strength is defined as one-half of the force necessary to break a loop of filament of the denier found in the denominator, and the filament denier is defined by formula:

$$\text{filament denier} = 4.55 \times S \times D^2$$

wherein S represents the specific gravity, and D the diameter of the filament in thousandths of an inch.

The examples below were conducted in a rotating 250 ml round-bottom flask attached to a rotary vacuum evaporator. The standard taper glass stopper at the top end of the condenser was replaced by a standard taper inner ground glass joints to which a stainless-steel tube had been attached by means of a Kovar seal. A stainless-steel union connected the stainless-steel tube to a Teflon (trademark) ferrule with a centered opening through which passed a stainless-steel sheathed, iron-constantan thermocouple. The internal thermocouple iron-constantan thermocouple. The internal thermocouple length was adjusted to be located essentially in the center of the reaction mass. The rotating flask was heated by hot air provided by a 1-liter beaker-type heating mantle covered with aluminum foil at the top so as to allow room for the neck of the rotating reaction flask. In the examples conducted under nitrogen, the upper portion of the neck of the flask extending above the aluminum foil cover of the mantle was heated with a hot air blower to prevent excessive condensation and return to the flask of evolved monocarboxylic acid. The N-alicyclic diamides employed in the examples were mixtures of geometrical isomers, but individual isomers are of course also operable in the invention.

The following examples will serve to illustrate the practice of the invention in more detail.

EXAMPLES

Polymers from bis(4-acetamidocyclohexyl)methane

A. A mixture of 14.7 g. (0.050 mole) of bis(4-acetamidocyclohexyl)methane (which may be prepared, for example, in accordance with Example 1A of U.S. Pat. No. 3,867,443 referred to above) and 11.5 g. (0.050 mole) of 1,12-dodecanedioic acid was heated under nitrogen in the apparatus described above for 2.5 hr. at 245°–265°, followed by 1.3 hr. at 295°. Heating was continued at 3 mm. pressure for 1.0 hr. at 300°–310°. A small portion of the product was removed after cooling, and the solid product had an inherent viscosity of 0.30 determined as indicated above. The remainder of the product was heated for an additional 1.0 hr. at 310° and 3 mm. pressure. The solid product then had an inherent viscosity of 0.40 (corresponding to an intrinsic viscosity of about 0.53).

B. Example A was repeated under nitrogen for 1.5 hr. at 240°, followed by 2.5 hr. at 240°–255°, of which 1.7 hr. were at 250°–255°, then heated to 280° in 0.7 hr., maintained at 280°–285° for 0.8 hr., then heated at 3 mm. pressure to 310° in 0.3 hr., and maintained at 310°–315° and 3 mm. pressure for 2.0 hr. The solid product had an inherent viscosity of 0.40.

The product was dissolved in m-cresol. The addition of methanol and hexane resulted in formation of a tar which was then washed with methanol and hexane. Removal of the solvents in a rotary evaporator at 190° and 5 mm. pressure gave a polymer with an inherent viscosity of 0.68 . This corresponds to an intrinsic viscosity of 1.81 indicating a number average molecular weight of 19,000 according to the Beste et al. equation.

This material was spun into a fiber at 210°. The resulting fiber was then drawn to approximately twice its original length at 120°. The diameter of the drawn fiber was measured in a microscope as 0.24 mm. It had a breaking strength of 21 g. Assuming a specific gravity of conventional polyamides of 1.14, the filament denier was equal to 4.6 denier, and the tensile was equal to 4.6 g./denier, determined as indicated above.

C. Example A was repeated under nitrogen for 3.0 hr. at 265°, followed by 1.0 hr. at 285°. Heating was continued at 15 mm. pressure for 1.0 hr. at 310°, followed by 3.0 hr. at 305°–315° and 5 mm. pressure. The solid product had an inherent viscosity of 0.52. This material was spun at 180° and drawn to twice its length at 120° resulting in a filament of 6 denier which had a breaking strength of 12 g. or a tensile of 2 g./denier.

D. Example A was repeated under nitrogen for 2.5 hr. at 250°–270°, followed by 1.0 hr. at 280°–290°.

Heating was continued at 3 mm. pressure for 2.0 hr. at 330°–340°. The solid product had an inherent viscosity of 0.41.

E. Example A was essentially repeated; the reaction mixture was heated under nitrogen for 0.5 hr. at 235°–250°, followed by 2.0 hr. at 250°–265°, and then 1.3 hr. at 275°–280°. Heating was continued at 3 mm. pressure for 2.0 hr. at 305°–320°. The solid product had an inherent viscosity of 0.43.

F. Example A was repeated with the addition of 1.0 ml ($2.5 \times 10^{-4}$ mole) of 0.25 N sodium hydroxide solution and the reaction mixture heated under nitrogen for 2.5 hr. at 250°–260°, followed by 1.3 hr. at 280°–285°. Heating was continued at 3 mm. pressure for 2.0 hr. at 310°–315°. The solid product had an inherent viscosity of 0.40.

In contrast to the above fiber-forming products, the product of Beste et al. cited above having an intrinsic viscosity of 0.48 has an inherent viscosity of about 0.27 Similarly the product of Rafikov et al. cited above having a specific viscosity of 0.16 has an inherent viscosity of only 0.21.

We claim:

1. A process for producing a fiber-forming N-alicyclic polyamide comprising mixing a dicarboxylic acid of the formula

HOOC—R—COOH wherein R is a 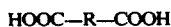 group wherein $z$ is an integer from 3 to 20, with an N-alicyclic diamide of the formula

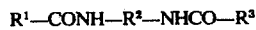

wherein $R^1$ and $R^3$ may be the same or different and are hydrogen, an alkyl radical having 1 to 18 carbon atoms, phenyl or benzyl, and $R^2$ is a cycloalkylene group having 6 to 12 carbon atoms or an alkanebiscycloalkylene group having 13 to 20 carbon atoms, and heating the mixture (I) under an inert atmosphere and atmospheric pressure for 2–10 hours at a temperature of from 220° to 350° C. and then (II) at a pressure of from 1 to 50 mm of Hg for ⅓ – 10 hours at a temperature of from 300° to 350° C, whereby there is produced an N-alicyclic polyamide containing repeating structural units having the formula

wherein R and $R^2$ are as defined previously, said polyamide having an inherent viscosity of at least 0.4 deciliters per gram measured at 25° C and a concentration of 0.5 gram of said polyamide in 100 milliliters of m-cresol.

2. A process as in claim 1 wherein stage (I) is carried out for 3 to 6 hours at a temperature of from 235° to 300° C and stage (II) is carried out at a pressure of from 3 to 15 mm of Hg for ⅓ – 4 hours at a temperature of from 300° to 340° C.

3. A process as in claim 1 in which $R^1$ and $R^3$ are methyl.

4. A process as in claim 1 in which the said dicarboxylic acid is selected from the group consisting of glutaric acid, adipic acid, pimelic acid, suberic acid, azelic acid, sebacic acid, and 1,12-dodecanedioc acid.

5. A process as in claim 1 in which the said N-alicyclic diamide is selected from the group consisting of bis(4-acetamidocyclohexyl)methane, 1,3-cyclohexylenebisacetamide, 1,4-cyclohexylenebisacetamide, 1,3-(4-methylcyclohexylene)bisacetamide, bis(4-acetamidocyclohexyl), 1,2-di(4-acetamidocyclohexyl)ethane, bis(2-methyl-4-acetamidocyclohexyl)methane, 2,2-di(4-acetamidocyclohexyl)propane, 1,6-di(4-acetamidocyclohexyl)hexane, 1,5-bisacetamidodecalin, and 1,7-bisacetamidodecalin.

6. A process as in claim 1 in which the said dicarboxylic acid is 1,12-dodecanedioic acid.

7. A process as in claim 1 in which the said N-alicyclic diamide is bis(4-acetamidocyclohexyl)methane.

8. A process as in claim 1 in which the said dicarboxylic acid is 1,12-dodecanedioic acid and the said N-alicyclic diamide is bis(4-acetamidocyclohexyl)methane.

* * * * *